Figure 1:
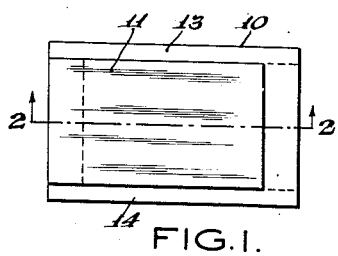

Dec. 7, 1943.   D. E. GRAY   2,336,091
ELECTRICAL CONDENSER
Filed June 15, 1940

INVENTOR.
Donald E. Gray
BY
ATTORNEY.

Patented Dec. 7, 1943

2,336,091

UNITED STATES PATENT OFFICE 2,336,091

ELECTRICAL CONDENSER

Donald E. Gray, Teaneck, N. J., assignor to Cornell-Dubilier Electric Corporation, South Plainfield, N. J., a corporation of Delaware Application June 15, 1940, Serial No. 340,693

6 Claims. (Cl. 175—41)

The present invention relates to electrical condensers and methods of manufacturing such condensers, more particularly to condensers of the type comprising dielectric elements coated with metallic layers to serve as the condenser electrodes as distinguished from condensers of the type comprising separate metallic and dielectric layers stacked or otherwise interleaved and connected to provide a condenser unit having a desired electrical capacity.

Stack type condensers of known construction usually comprise a plurality of alternate layers of metallic sheets interleaved with dielectric sheets such as plates of mica, ceramic or the like. Alternate metal layers usually extend beyond opposite edges of the dielectric sheets with the projecting portions of the layers being united to serve as electrical terminals for the condenser unit.

The metallic and dielectric elements in stacked type condenser structures of the above character are maintained in juxtaposed relation and with their respective surfaces in more or less intimate contact by the provision of one or more pressure clamps encircling the condenser stack. In an effort to ensure sufficient electrical stability of condensers of this type, bulky clamp structures and substantial compression forces are required to maintain the dielectric and metallic elements in intimate contact and to prevent relative lateral movement and appreciable variations of the capacity and other characteristics of the condenser due to heating and other causes affecting the condenser and its operation.

The application of a considerable pressure to ensure the desired degree of electrical stability in many cases will result in a damage of the dielectric or electrode elements. Numerous attempts have been made to obviate this drawback and to improve the electrical stability of condensers of the above type, in particular the stability of the condenser when subjected to substantial temperature variations. Such attempts include the impregnation of the condenser stack with wax, oil, resin or the like and the application of the electrodes to the dielectric elements in a more or less molecular contact with the dielectric surface. These endeavors have not been entirely satisfactory in the past for improving the electrical stability of condensers and to satisfy the requirements under various operating conditions.

The electrical stability of a condenser of the above mentioned type, particularly its ability to maintain a substantially constant capacity when subjected to varying temperatures is dependent upon various factors, particularly upon the surface contact between the dielectric sheets and the electrode layers, the coefficient of expansion of the metal clamp encircling the condenser stack or of a resinous envelope or casing molded around the condenser stack, and upon the relative alignment of the electrode sheets in the condenser stack.

Accordingly, an object of the present invention is to improve the electrical stability of a condenser embodying solid dielectric sheets interleaved with metallic layers.

A more specific object is to provide a condenser structure embodying dielectric elements coated with metallic layers forming the condenser electrodes, wherein the electrical capacity of the condenser is substantially independent of internal and external temperature variations to which the condenser is subjected during operation.

Another object is the provision of means for and methods for economically coating dielectric elements with a metallic surface to provide a permanent and closely adhering electrode layer for use in condenser structures according to the invention.

Figure 2:
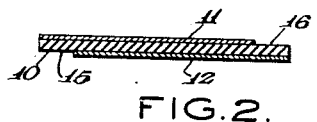
Figure 3:
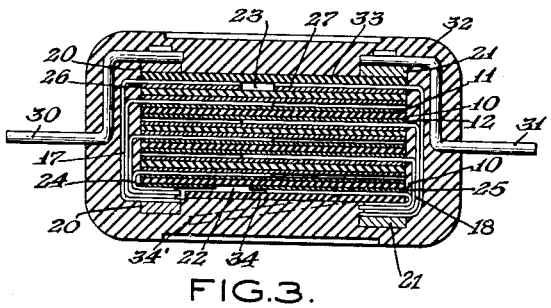

Other objects and advantages of the invention will become more apparent from the following detailed description taken with reference to the accompanying drawing forming part of this specification and wherein:

Figure 1 is a plan view of a dielectric sheet coated on opposite sides with metallic layers and serving as an element in a condenser structure according to the invention, Figure 2 is a cross-section taken on line 2—2 of Figure 1, Figure 3 is a cross-sectional view showing a complete electrical condenser unit comprising elements according to Figures 1 and 2.

Like reference characters identify like parts throughout the different views of the drawing.

Referring more particularly to Figures 1 and 2, there is shown a solid dielectric layer or sheet 10 such as a sheet of mica, glass, porcelain, etc., having a pair of electrode layers or coatings 11 and 12 applied to the opposite faces thereof with suitable margins 13 and 14 being kept on both sides along one pair of opposite edges of the sheet 10. Additional insulating margins 15 and 16 are provided one on the upper face and the other on the lower face of the dielectric sheet at the remaining opposite edges to afford suitable insulation between the metallic layers 11 and 12 and to prevent creeping currents or sparking between the electrodes. It is to be noted that the electrode layers 11 and 12 exactly register or coincide along the margins 13 and 14 thus preventing capacity effects between electrodes of different insulating sheets having unlike polarity in a stack comprising a plurality of coated dielectric elements as shown in Figure 3.

In Figure 3 a number of coated dielectric sheets 10 are stacked one upon another to obtain a desired final capacity of the complete condenser unit. Electrical connection between the electrode layers of like polarity is effected by the provision of conducting metal foils or tabs 17 and 18 interposed between the composite dielectric and electrode layers and extending alternately beyond the opposite edges of the stack. The extending portions of the conducting sheets or strips 17 and 18 are reversely bent around the edges of the stack and upon one of the faces, in the example shown the lower face, of the stack to make contact with each other and with the terminal-clamp members 20 and 21 encircling the opposite ends of the stack.

In order to prevent stray capacities between the outermost electrode layers of the stack and the terminal clamps 20 and 21 through the end covering plates 33 and 34 as the dielectric, uncoated spaces 22 and 23, respectively, are provided in the outermost electrode layers of the stack dividing the same into two portions 24, 25 and 26, 27, respectively. In this manner the return connection of the stray condenser, formed by the clamps 20 and 21 and the overlapping adjacent portion of the outermost metal layers with the end cover plates 33 and 34 as the dielectric, to the clamp of opposite polarity through said layers is interrupted by the insulating spaces 22 and 23, thus isolating the stray capacity and eliminating its effect upon the total capacity of the condenser. To further improve this advantage and the stability of the condenser, the partial layers 25 and 26 are electrically connected to the adjacent clamps 20 and 21, respectively, by means of additional tabs similar to the electrode connecting tabs 17. In this manner, the terminal clamp 20 is in juxtaposed relation to the electrode layers 24 and 26 which are at the same polarity as the extending connecting strips 17, while the clamp 21 is arranged in a similar manner in respect to the extending conducting strips 18.

From the foregoing it will be apparent that since the dielectric sheets 10 are in intimate contact with the electrode layers applied to both sides thereof any expansion of the terminal clamps will have no effect upon this relationship. Moreover, as pointed out, since the clamps 20 and 21 overlie electrode areas having the same polarity as the clamps and isolated from the clamps of opposite polarity, capacity effects due to movement or shifting of the clamps in relation to the underlying electrodes such as caused by the expansion due to heating, will be eliminated. The condenser in the example shown is provided with the terminal leads 30 and 31 secured to the clamps 20 and 21, respectively, in any suitable manner for mounting and connecting the condenser unit in an electrical apparatus. A molded resinous envelope 32 which may consist of Bakelite or any other suitable molding material surrounds the condenser unit to provide adequate mechanical and other protection in a manner well understood by those skilled in the art.

The electrode layers deposited on the dielectric sheets in any suitable manner such as according to the methods to be described in detail hereafter will substantially conform to the surface contour of the sheets so that their outer surfaces will be microscopically roughened. Thus, if the resinous envelope 32 is applied by a molding operation, the resin will flow into the microscopic interstices and adhere thereto with great strength.

It has been found when using a laminated dielectric such as mica and molding the condenser in a resinous envelope in the manner described, the adherence of the resin to the electrode layer may be so great as to result in a separation of the laminae of the dielectric, thereby greatly impairing or completely destroying the electrical stability of the condenser. In order to prevent the resinous material from coming into contact and adhering to the outermost electrode layer of the stack, protective plates of insulating material 33 and 34 are arranged between the electrodes 24, 25 and 26, 27 and the clamps 20 and 21, respectively. If it is desirable to adjust the capacity of the condenser after completion of the stacking and clamping, this is accomplished according to the invention by clamping the insulating sheet 34 at one side only leaving the opposite side free to move. The capacity is adjusted by flexing the sheet 34 outwardly as indicated in dotted lines at 34' and scraping or removing a portion of the electrode layer 25 from the surface of the outermost dielectric sheet, whereupon the sheet 34 is allowed to return to its normal position and the condenser molded in a resinous casing or envelope.

It has been found advantageous in many cases to fill the spaces between the dielectric sheets and the conducting strips with an insulating material. This may be accomplished by impregnating the condenser in a wax, varnish or the like either before or after molding. When varnish is used as an impregnating material the impregnation is preferably carried out prior to the molding process and the varnish used is advantageously of the fixable resin type. A suitable varnish suited for the purpose of the invention is known in the trade as Bakelite varnish and is believed to be composed of a phenol formaldehyde resin dissolved in an evaporable solvent. The varnish impregnated condenser unit is dried and subjected to a temperature of about 325° F. to thoroughly polymerize the resin and convert it to an infusible state so as not to adhere to the resinous envelope 32 during the molding operation.

The varnish impregnation and subsequent polymerization is of particular advantage in maintaining the electrode layers in proper relation ir registry to substantially prevent capacity variations between the layers on one dielectric sheet and the layers of an adjacent sheet. If desired, in order to further prevent the varnished condenser unit from adhering to the casing 32, the varnished unit after polymerization of the varnish is dipped in melted wax to provide a thin wax layer between the two fixed plastics, that is, the impregnaitng varnish on the one hand and the enclosing resinous casing on the other hand. Suitable materials which may be used for the above purpose are paraffine or other low melting point petroleum waxes. According to a modified process, the condenser unit after stacking and before the application of the terminal clamps may have one end dipped in melted wax to hold the stack together whereupon the unit is subjected to heat and pressure to melt the wax and cause it to flow into the interstices of the stack. Excess wax may be removed during the heating and pressing operation by placing the condenser between blotting paper or the like capable of absorbing the excess wax.

Electrical condensers constructed in the aforedescribed manner with mica as a dielectric material are very stable as regards their electrical characteristics and when subjected to varying temperatures will vary in their capacity value to a very small degree and it has been found that this change in capacity is positive and of the order of .0025% per degree C., that is, if the temperature of the condenser increases by one degree the capacity will change by the aforementioned amount. The capacity variation is probably due to a change of the dielectric constant of the mica with varying temperatures and in most cases is sufficient to more than balance any changes in capacity due to a greater or lesser separation of the electrodes due to expansion of the dielectric elements caused by a temperature increase.

The electrode layers or coatings applied to the dielectric element may be produced in various manners and by the employment of special methods.

According to one method which has been found to produce satisfactory results, various silver salt compounds dissolved in a water solution and applied to the dielectric surface are subjected to reduction by a suitable reducing agent such as sugar, glycerine, alcohols or the like.

This method has been found to be particularly advantageous if a dilute solution of tin chloride is applied to the dielectric surface and excess solution removed prior to the application of the silver salt solution. A suitable concentration of the tin chloride solution has been found to be composed of about $\frac{1}{10}$ gram of tin chloride dissolved in 100 cm. of water. Such a solution promotes the deposit of the silver layer on the dielectric surface, probably due to the formation of a minute quantity of silver chloride prior to the depositing of the silver layer. In applying a silver layer to the dielectric surface, good results have been obtained by dissolving one gram of silver nitrate in distilled water and adding .3 gram of sodium hydroxide which will cause this solution to assume a brownish-black color. Subsequently, a sufficient quantity of ammonium hydroxide is added to dissolve the silver oxide precipitate and to return the solution to the water color state. The solution is preferably cooled to a temperature between 5 and 15° C. and the dielectric sheets to be coated submerged in the solution. Thereupon, about 10 ccm. of alcohol slightly acidified with nitric acid to a pH-value of about 6.3 and three grams of glucose in the form of a simple syrup are added to the solution. The syrup may be prepared by dissolving rock candy sugar or the like in a small amount of water. The mixed solution is then agitated for a period of about 6 to 10 minutes during which time it will pass through a color range from black to brown to gray. The dielectric sheets are removed when the first trace of gray coloration is discernible and it will be found that a bright coherent and uniform coating of silver has been deposited all over the exposed surfaces of the dielectric. It has been found that in some cases it is desirable to admix as a reducing agent to the silver nitrate sodium hydroxide, ammonium hydroxde solution, instead of the syrup solution described above approximately 25 grams of glycerine, ethylene glycol or another water soluble polyhydric alcohol and to allow the reducing action to continue for a period of 1 to 1½ hours. By the latter method, a small amount of heat should be applied to gradually increase the temperature of the mixture up to about 75° C. In this manner, a silver coating having improved adhering properties to the dielectric is obtained.

In order to provide insulating margins as described and shown, suitable blocking or masking devices may be used for blocking out the end portions of the mica or other insulating sheets.

It will be evident from the foregoing that the invention is not limited to the specific details and arrangement of parts as well as steps described and disclosed herein for illustration, but that the underlying concepts and general principle of the invention are susceptible of numerous variations and modifications coming within the broader scope and spirit of the invention as defined in the appended claims. The specification and drawing are accordingly to be regarded in an illustrative rather than a limiting sense.

I claim:

1. A stacked electrical condenser comprising sheets of dielectric material interleaved with tabs of conducting material alternating with said dielectric sheets, said dielectric sheets being provided on their opposite faces, in back-to-back relation, with coated conducting areas, insulating end sheets upon the opposite faces of the stack, the conducting tabs alternately extending from different sides of the stack and adjacent ones of the tabs of like polarity extending from the same side of the stack being reversely bent upon the outer face of one of said end sheets, and a pair of metallic terminal clamps gripping the opposite ends of the stack and each engaging the bent over ends of the tabs of like polarity, the outer conducting areas of the uppermost and lowermost dielectric sheets being interrupted by an uncoated zone to substantially prevent capacity effects between said clamps and the adjacent conducting areas of opposite polarity.

2. A stacked electrical condenser comprising sheets of dielectric material interleaved with tabs of conducting material alternating with said dielectric sheets, said dielectric sheets being provided on their opposite faces, in back-to-back relation, with coated conducting areas, the conducting areas of one sheet substantially registering with the conducting areas of the adjacent sheet in the stack, insulating end sheets upon the opposite faces of the stack, the conducting tabs alternately extending from opposite sides of the stack and adjacent ones of the tabs of like polarity extending from the same side of the stack being reversely bent upon the outer face of one of said end sheets, and a pair of metallic terminal clamps gripping the opposite ends of the stack and each engaging the bent over ends of the tabs of like polarity, the outer conducting areas of the uppermost and lowermost dielectric sheets being interrupted by a transverse uncoated zone to substantially prevent capacity effects between said clamps and the adjacent conducting areas of opposite polarity.

3. A stacked electrical condenser comprising sheets of dielectric material interleaved with tabs of conducting material alternating with said dielectric sheets, said dielectric sheets being provided on their opposite faces, in back-to-back relation, with coated conducting areas, the conducting areas of one sheet substantially registering with the conducting areas of the adjacent sheet in the stack, insulating end sheets upon the opposite faces of the stack, the conducting tabs alternately extending from opposite sides of the stack and adjacent ones of the tabs of like polarity extending from the same side of the stack being reversely bent upon the outer face of one of said end sheets, a pair of metallic terminal clamps gripping the opposite ends of the stack and each engaging the bent over ends of the tabs of like polarity, the outer coated areas of the uppermost and lowermost dielectric sheets in the stack comprising two separated sections one forming an active electrode connected to the adjacent clamp, and the other being inactive, and conducting means connecting the inactive sections with the adjacent clamp.

4. A stacked electrical condenser comprising sheets of dielectric material interleaved with tabs of conducting material alternating with said dielectric sheets, said dielectric sheets being provided on their opposite faces, in back-to-back relation, with coated conducting areas, the conducting areas of one sheet substantially registering with the conducting areas of the adjacent sheet in the stack, insulating end sheets upon the opposite faces of the stack, the conducting tabs alternately extending from opposite sides of the stack and adjacent ones of the tabs of like polarity extending from the same side of the stack being reversely bent upon the outer face of one of said end sheets, a pair of metallic terminal clamps gripping the opposite ends of the stack and each engaging the bent over ends of the tabs of like polarity, the outer coated areas of the uppermost and lowermost dielectric sheets comprising two separated sections one forming an active electrode connected with the adjacent clamp and the other being inactive, and metallic strips having one end inserted in the stack in contact with said inactive sections and having their other ends inserted between the adjacent clamp and the stack.

5. A stacked electrical condenser comprising sheets of dielectric material interleaved with tabs of conducting material alternating with said dielectric sheets, said dielectric sheets being provided on their opposite faces, in back-to-back relation, with conducting coatings, insulating end sheets upon the opposite faces of the stack, the conducting tabs alternately extending from different sides of the stack and adjacent ones of the tabs of like polarity extending from the same side of the stack being reversely bent upon the outer face of one of said end sheets, a pair of metallic terminal clamps gripping the opposite ends of the stack and each engaging the bent over ends of the tabs of like polarity, the outer coatings of the uppermost and lowermost dielectric sheets having a restricted area compared with the remaining coatings to substantially prevent capacity effects between said clamps and the adjacent conducting coatings with said end sheets as dielectrics.

6. A stacked electrical condenser comprising sheets of dielectric material interleaved with tabs of conducting material alternating with said dielectric sheets, said dielectric sheets being provided on their opposite faces, in back-to-back relation, with coated conducting areas, insulating end sheets upon the opposite faces of said stack, said conducting tabs alternately projecting from different sides of the stack and adjacent ones of the tabs of like polarity projecting from the same side of the stack being reversely bent upon the outer face of one of said end sheets, a pair of metallic terminal clamps gripping the opposite ends of sad stack and each engaging the bent over ends of the tabs of like polarity, the outer conducting areas of the uppermost and lowermost dielectric sheets being provided with an uncoated zone to substantially prevent capacity effects between said clamps and the adjacent conducting areas of opposite polarity with said end sheets as dielectrics.

DONALD E. GRAY.